(12) United States Patent
Magrini

(10) Patent No.: US 12,239,058 B1
(45) Date of Patent: Mar. 4, 2025

(54) IRRIGATION DEVICE AND KIT

(71) Applicant: Massimo Magrini, Gatteo (IT)

(72) Inventor: Massimo Magrini, Gatteo (IT)

( * ) Notice: Subject to any disclaimer, the term of this patent is extended or adjusted under 35 U.S.C. 154(b) by 2 days.

(21) Appl. No.: 18/462,103

(22) Filed: Sep. 6, 2023

(51) Int. Cl.
*A01G 25/06* (2006.01)

(52) U.S. Cl.
CPC .................... *A01G 25/06* (2013.01)

(58) Field of Classification Search
CPC ........ A01G 25/06; A01G 25/00; A01G 29/00; A01C 21/00
See application file for complete search history.

(56) References Cited

U.S. PATENT DOCUMENTS

| | | | | |
|---|---|---|---|---|
| 4,361,983 | A * | 12/1982 | Wilson | A01G 25/00 47/9 |
| 4,726,143 | A * | 2/1988 | Steinbeck | A01G 29/00 47/48.5 |
| 5,253,952 | A * | 10/1993 | Selway | B05B 15/622 404/2 |
| 5,761,846 | A * | 6/1998 | Marz | A01G 25/06 47/48.5 |
| 5,795,100 | A * | 8/1998 | Thomas | A01G 25/06 405/36 |
| 7,681,356 | B2 | 3/2010 | Sheldrake | |
| 7,685,766 | B2 | 3/2010 | Amsellem | |
| 7,862,254 | B2 | 1/2011 | Jin Hyun | |
| 8,132,362 | B2 | 3/2012 | King | |
| 8,413,372 | B2 * | 4/2013 | King | A01G 29/00 47/79 |
| 8,689,819 | B2 * | 4/2014 | Hashimoto | A01G 25/06 52/12 |
| D776,994 | S | 1/2017 | Herrmann | |
| 2008/0092440 | A1 | 4/2008 | Johnson | |
| 2016/0255780 | A1 | 9/2016 | Lockshaw | |
| 2016/0286745 | A1 | 10/2016 | Riffe et al. | |
| 2018/0035621 | A1 * | 2/2018 | Allen | A01G 29/00 |

FOREIGN PATENT DOCUMENTS

CN 111066640 A 4/2020

\* cited by examiner

*Primary Examiner* — Kristen C Hayes
(74) *Attorney, Agent, or Firm* — Omni Legal Group; Omid E. Khalifeh; Ariana K. Santoro

(57) ABSTRACT

An irrigation device and kit are provided comprising a water collection means having at least one inlet, a body having at least one outlet, an adapter to secure the body to the water collection means, and a gasket comprising a filter. The water collection means extends above the soil's surface and has a cap, the at least one inlet, and a collector. The body has a first and second end separated by a sidewall to define a reservoir in communication with the water collection means, any of which may extend below the soil surface. Water collected above the soil's surface may be transported from the water collection means through the filter to the reservoir and distributed through the at least one outlet disposed on the sidewall to the root system.

18 Claims, 11 Drawing Sheets

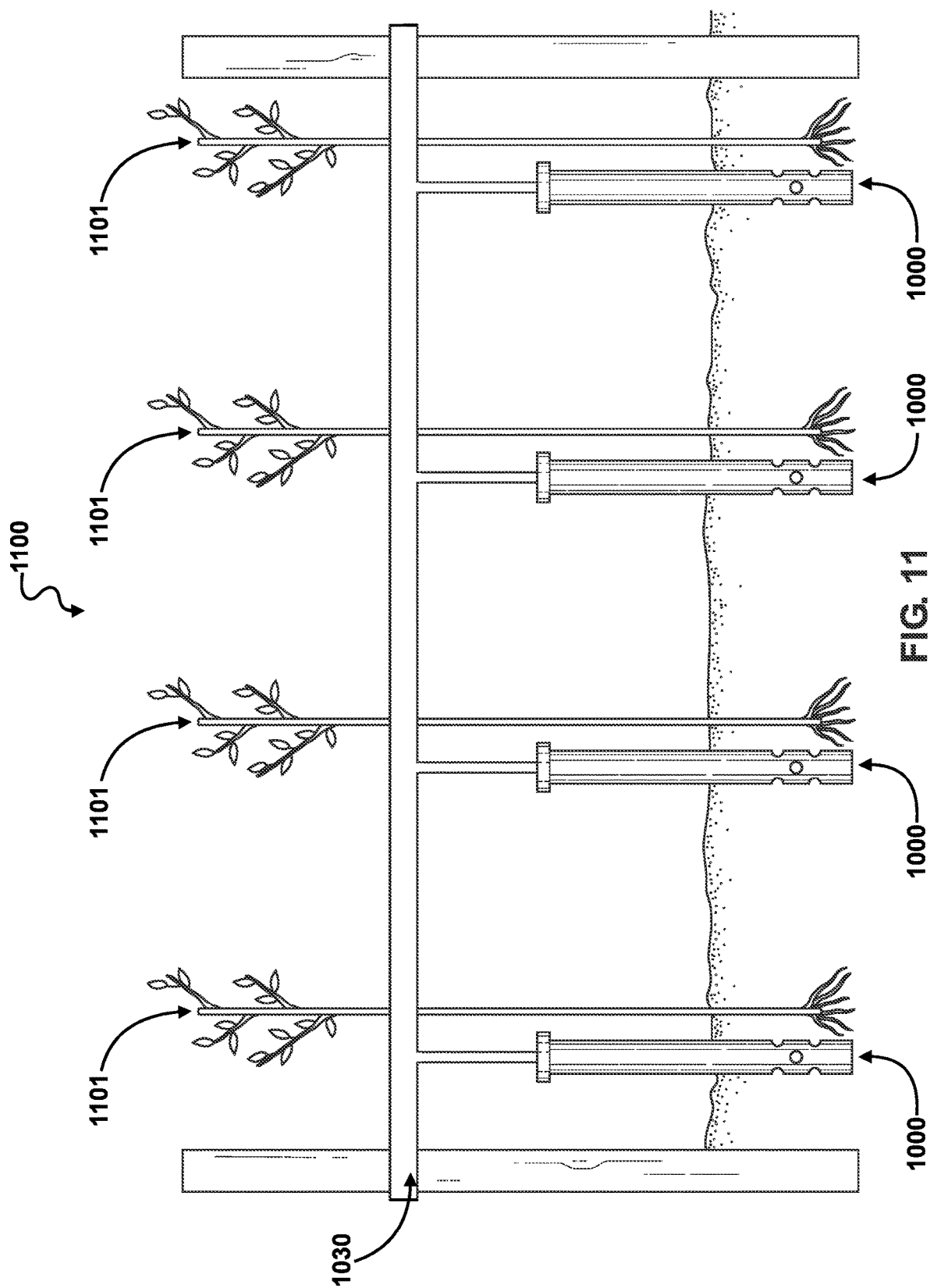

IRRIGATION DEVICE AND KIT

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to irrigation devices, and, more particularly to an irrigation device for the delivery of water and other nutrients to a plant's root system.

BACKGROUND

Ensuring that plants receive the proper nutrients is crucial for their successful growth. A plant's underground root system is vital in absorbing water and nutrients from the soil, which are essential for its overall health and development. Moreover, the root system serves as an anchor, providing stability and support for the plant. Therefore, fostering robust and healthy root systems is imperative for the optimal growth and longevity of plants.

Surface irrigation, such as sprinklers and drip lines, manual watering, and rainfall, are some of the most common irrigation means because they may be easily set up, customized and are widely available. However, surface irrigation often proves inefficient due to various factors that lead to water and nutrient loss. Less than half of the water on the surface reaches the root system due to evaporation, poor soil penetration, oversaturation, and other factors. Similarly, surface penetration may result in the loss of supplemental nutrients, such as fertilizers, limiting the available nutrients for the root system to absorb. The loss of water and nutrients due to surface penetration affects many plants, particularly those with deep root systems, such as trees, resulting in shallow root systems, compromising the plant's anchoring ability and leading to weakened plants that struggle to obtain the necessary nutrients. As a result, there is a recognized need for an irrigation device that permits the targeted delivery of water and other nutrients, such as fertilizers, to the root systems.

Currently, proposals for root irrigation systems utilize interconnected irrigation systems. For example, U.S. Pat. No. 9,055,718 to Geerligs and 6,540,436 to Ogi disclose root irrigation devices that receive water from underground piping, thus requiring trenching to install the irrigation devices. These devices are then in set configurations, and damage along the irrigation network may result in the failure of other portions of the system. Repairing the damage is often labor-intensive and time-consuming, as the underground nature of the irrigation system may make pinpointing the damage and repairing it challenging. Further, Geerligs and Ogi's proposals solely rely on a connected water source for their water supply. These proposals are unable to utilize alternative water sources, like rainwater or mist. Additionally, they lack the ability to incorporate additional nutrients, such as fertilizers, into their irrigation systems.

Other proposals for root irrigation include U.S. Pat. No. 2,837,869 to Chatten and U.S. Pat. No. 7,685,766 to Amsellem for individual watering devices, which comprise a refillable water reservoir located above the soil surface and a below-surface delivery means. These proposals are generally targeted for use with small gardens or potted plants as they have small reservoirs that need to be manually refilled by a user. Further, the reservoir is located above the soil surface, exposing the reservoir to the sun, which creates a damp and warm environment conducive to algae and bacterial growth. As a result, these proposals require significant attention from their users to provide sufficient clean water to the plant.

Currently, no solution proposes a root irrigation device that may be used in independently of or in communication with other root irrigation devices to adaptably provide water and other nutrients to the plants. Thus, although various proposals have been made to solve the problem, none of those in existence combine the characteristics of the present invention.

SUMMARY

The present disclosure is directed to an irrigation device and kit. More particularly, the present disclosure is directed to a root irrigation device and kit thereof that, during use, is positioned partially through topsoil near a desired plant, to permit water and other nutrients to be delivered to a plant's root systems. One of ordinary skill in the art will recognize that soil is separated into the following layers, in descending order, humus, topsoil, subsoil, parent layer, and bedrock. The topsoil and subsoil generally comprise the root system, and the plant's stems and leaves may extend above the humus. The humus may be interchangeably referred to as the soil surface, both of which should be understood to be the portion of soil visible to the human eye where plant stems extend off.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, the irrigation device may comprise a water collection means, a body, at least one outlet disposed of in the body, an adapter to secure the water collection means to the body, and a gasket comprising a filter. Any of the irrigation device may be configured to at least partially extend below the soil surface to provide water to a plant's root system, and any of the irrigation device may extend above the soil surface to collect water and nutrients to collect water and nutrients from the surrounding environment. More particularly, any of the body that comprises the at least one outlet may extend below the soil surface, and at least the water collection means may extend above the soil surface.

The body may comprise a first and second end separated by a tubular sidewall to define a reservoir in horizontal communication with the water collection means. More particularly, the reservoir may be in horizontal communication with the at least one inlet to permit water and other nutrients collected at the water collection means to be temporarily stored in the reservoir. The body may be described as an upper portion extending from the first end and a lower portion extending from the second end. The upper portion may extend above the soil surface when in use and may secure to the adapter and the lower portion may extend below the soil surface and comprise the at least one outlet.

The at least one outlet may be configured as at least one hole extending through the tubular sidewall to permit radial distribution of water. In some embodiments, any of the at least one hole may be vertically distributed along the sidewall to permit water to be distributed throughout the topsoil and subsoil. It is contemplated that distributing the water at various heights may encourage a strong and deeper root system through the promotion of downward growth. A person of ordinary skill will recognize that root systems are essential for plants to survive environmental conditions, such as droughts, winds, and flooding, with shallow root systems being more susceptible to being uprooted or failing to receive sufficient nutrients as a result of extreme weather conditions, than their deep root system counterparts.

In some embodiments, the at least one outlet may be configured as a first, second, and third set of holes, each set of holes having two holes extending through opposing portions of the sidewall. Each set of holes may be vertically spaced apart from each other to permit water to exit the at least one outlet at different depths in the subsoil and topsoil. Further, in some embodiments, any of the sets of holes may be radially offset from another set of holes. For example, the first and third set of holes may be in line with each other, and the second set of holes may be rotated ninety degrees relative to the first and third sets.

In a further embodiment, the at least one outlet may further comprise a fourth set of holes extending through the sidewall to permit further water flow out of the reservoir. The number and positioning of outlets on the sidewall may permit the irrigation device to accommodate different environments. For example, in drought-prone environments, additional holes may be advantageous, whereas, in environments with consistent rainfall, fewer holes may be needed to provide the plant with sufficient water and nutrients.

In one embodiment, each of the at least one outlet may comprise a semi-permeable membrane to permit the flow of water from the reservoir while preventing topsoil and subsoil from entering the reservoir through the at least one outlet. Of course, any of the at least one outlet or all the at least one outlet need not comprise the one-way permeable membrane.

Water and nutrients may be permitted to flow out of the reservoir when the water level is above any of the at least one outlet. Any of the at least one outlets below the water line may have a homogenous flow of water out of the reservoir. A person of ordinary skill in the art will recognize that water mixing with the soil may increase the water content around the at least one outlet, creating a temporary seal to reduce water flow out of the at least one outlet. As the moisture content in the soil is reduced, the temporary seal may be weakened, permitting water to flow into the surrounding soil. It is contemplated this may permit the water collection device to provide water and nutrients to each plant according to its particular environment and needs.

The second end of the body may comprise a stopper defining a closed end of the reservoir. In some embodiments, the stopper may comprise a vent to prevent stagnant water, also referred to as water residuals, in the lower portion. The vent may be a small hole located through the lowermost point of the irrigation device to permit residual water and nutrients to drain from the reservoir. Further, the vent being located on the stopper at the second end of the body may permit water unable to escape through the at least one outlet, which may make more water available to the root system.

The adapter may be configured to secure a lower end of the water collection means to the body to permit water and nutrients to be collected in the reservoir. The gasket may be positioned at either end of the adapter, and the filter may extend across the gasket, and thus extend over any end of the adapter to prevent debris from entering the reservoir. In some embodiments, the water collection means and/or the body may be removable about the adapter to permit the filter to be cleaned.

The adapter may comprise a male end and a female end, two male end, or two female ends. Either or both, ends of the adapter may be threaded, and either or both, of the lower end of the water collection means and the first end of the body may comprise corresponding threading. Likewise, the lower end of the water collection means and the first end of the body may be male and/or female according to the configuration of the adapter. In some embodiments, one end of the adapter may secure with the lower end of the water collection means or the first end of the body through a friction fit. Of course, any adapter configuration may be utilized in the current invention.

A person of ordinary skill in the art will recognize that adapters may also identify couplings, bushings, unions, or other fittings, any of which may be utilized in the present invention. In some embodiments, the adapter may be a reducer adapter, wherein a male end of the reducer adapter is secured to the tube, and a female end receives the water collection means.

The water collection means may comprise a cap, at least one inlet, and a collector configured to collect water and other nutrients. In one embodiment, the water collection means may further comprise a neck comprising the at least one inlet. Of course, in other embodiments, the cap may comprise the at least one inlet. The cap may be secured to the neck by a friction fit, threading, welding, or may be secured through any other manner that a person of ordinary skill in the art may recognize.

In some embodiments, the collector may be configured as a funnel to direct atmospheric water, such as rainwater, dew, and snow, to the at least one inlet. In embodiments comprising the neck, the neck may be positioned at the lower tapered end of the funnel, and the at least one inlet may be positioned along the neck to receive water collected by the funnel. It is contemplated that the at least one inlet positioned along the neck may be configured to at least partially filter the atmospheric water entering the at least one inlet. For example, this may be accomplished through a filtering net, variable hole sizes, or any other manner that a person of ordinary skill in the art may desire.

In other embodiments, the collector may be configured as a pipe operative to transport water from a water source to the at least one inlet located on the cap. It is contemplated that the pipe may be advantageous to provide water to the irrigation devices in environments where the atmospheric water may be insufficient to meet the needs of the plants.

In some embodiments, the water source may be a rainwater catchment system, such as a rainwater barrel. A person of ordinary skill in the art will recognize that rain and ambient water may provide additional benefits to plants, including higher acidic content, traces of organic matter, and macro-nutrients such as nitrogen. Thus, the irrigation device being operative to utilize rain and ambient water may provide beneficial nutrients to the plants to promote growth and health. Of course, in other embodiments, the water source may be tap water, streams, standing water, or any other source of water. Other collectors may be utilized to carry out the current invention without departing from the spirit of the invention.

Different water collection means may be removably secured to the adapter in order to accommodate environmental conditions. For example, a kit may comprise a plurality of water irrigation devices and may be utilized to provide water and nutrients to plants in a general area, such as a garden or orchard. Any of the plurality of water irrigation devices may be positioned in a desired configuration and may each be operative to collect water in the water collection means extending off the soil surface. In some embodiments, any of the water collection means may be connected through a series of above-ground piping, operative to supply water from the water source. Of course, any of the water collection means may be independent of each other and may collect water through any embodiment of the water collection means.

It is contemplated that the collectors being located above the soil surface may permit different embodiments of the water collection means to be accessed without necessitating the complete removal of the irrigation device. Further, repairs and other maintenance to the water collection means may be readily performed, as the water collection means is located above the soil surface. Additionally, the collector may be configured to receive additional nutrients, such as fertilizer, that may enter the reservoir and distributed to the plant's root system. For example, the collector may permit fertilizer to be introduced into the collected water which may be distributed to the plant's root system.

Several advantages of the irrigation device and kit are that they:
(a) delivers water below the soil's surface to increase availability of water and other nutrients to the plant's roots systems;
(b) permits customized irrigation and/or delivery of nutrients to the plant's root systems;
(c) may be easily cleaned and maintained; and
(d) promotes downward growth of root systems.

Thus it is an object of this invention to reduce water loss caused by surface irrigation through the targeted delivery of water and other nutrients below the soil surface to a plant's root system.

It is a further object of this invention to reduce water loss between the soil surface and the root system.

It is still another object of this invention to permit the customized placement of each irrigation device to accommodate unique configurations and quantity of plants.

It is yet a further object of this invention to provide an easily-accessible, above-ground, water collection means.

One or more of the above-disclosed embodiments, in addition to certain alternatives, are provided in further detail below with reference to the attached figures. The disclosed subject matter is not, however, limited to any particular embodiment disclosed.

BRIEF DESCRIPTION OF THE DRAWINGS

FIG. 11 shows one embodiment of an irrigation system comprising the irrigation device of FIG. 10.

Figure 1:
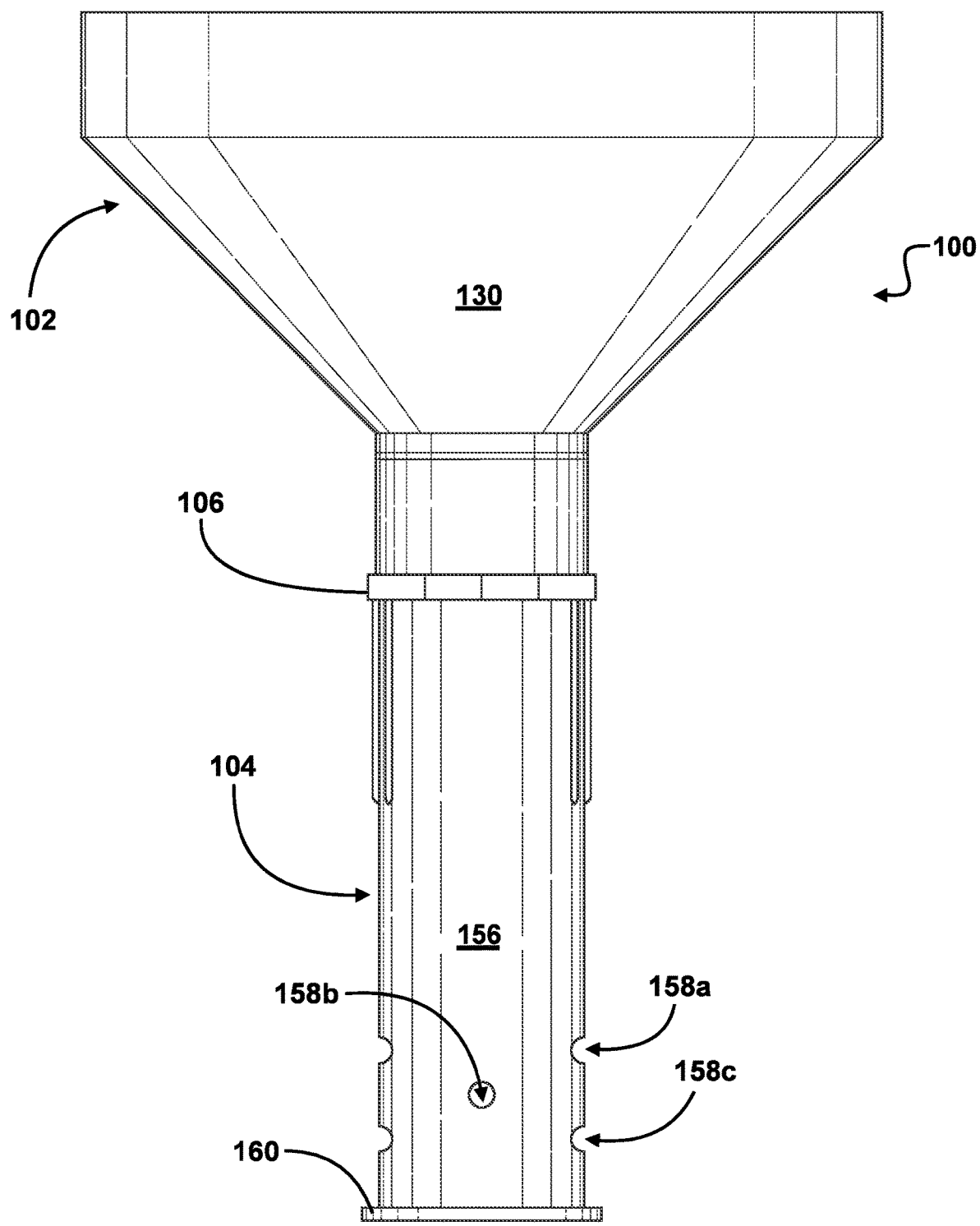
FIG. 1 shows a front view in accordance with one embodiment of the irrigation device.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

Figure 2:
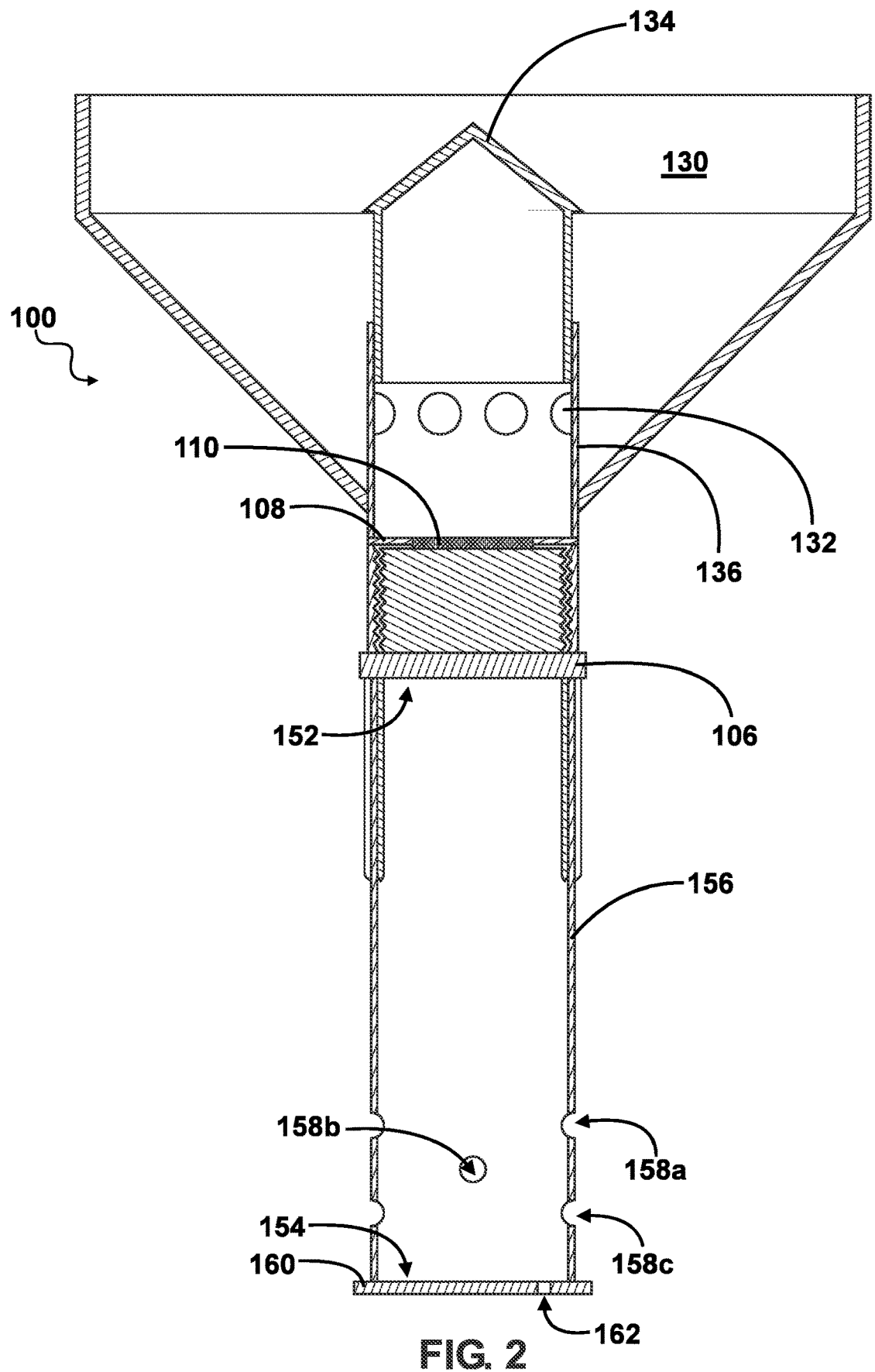
FIG. 2 shows a cross-section view of the embodiment of the irrigation device in FIG. 1.
Figure 3:
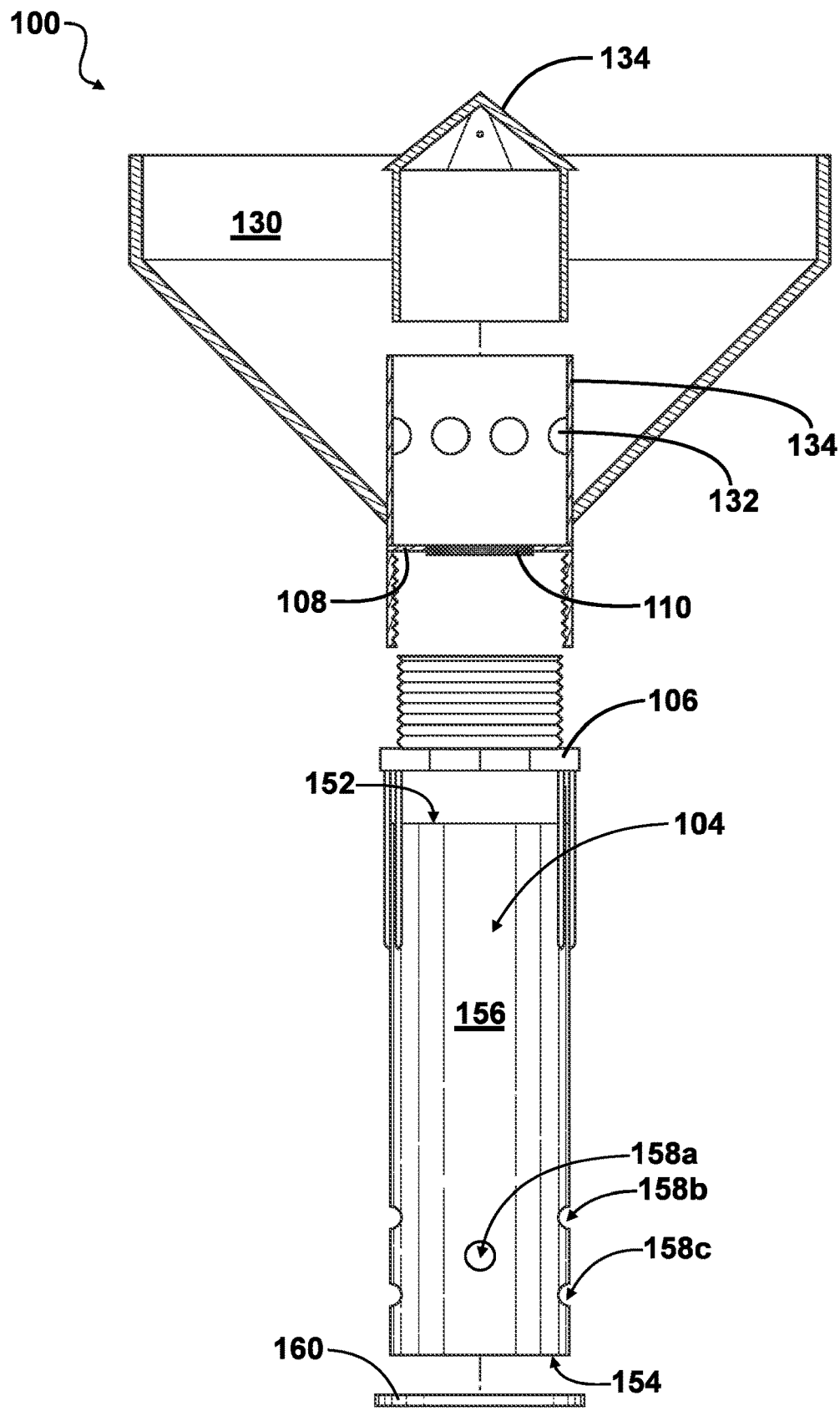
FIG. 3 shows an exploded view of the embodiment of the irrigation device in FIG. 1.

With reference to FIG. 1, one embodiment of an irrigation device 100 is shown. The irrigation device 100 comprises a water collection means 102 in horizontal communication with a body 104 defining a reservoir, through an adapter 106. FIG. 2 is a cross-sectional view of the embodiment of the irrigation device 100 illustrated in FIG. 1 and FIG. 3 is an exploded view of the same.

The water collection means 102 may comprise a collector configured as a funnel 130, a cap 134, and a neck 136 comprising at least one inlet 132. The neck 136 may extend from a lower portion of the funnel 130 and the at least one inlet 132 may be positioned along a portion of the neck 136 operative to receive water and nutrients collected by the funnel 130. In some embodiments, the funnel 130 may comprise a forty-five-degree slope and a winged straight portion and the mouth of the funnel may have a diameter between about 6 inches and about 10 inches and a total height between about 8 and about 11 inches. A person of ordinary skill in the art will appreciate the general form, shape, and size of funnels, any funnel may be utilized to practice the present invention and the aforementioned is provided as example only.

In the embodiment shown in FIG. 2, the at least one inlet 132 is configured as a plurality of holes extending through the neck 136. In some embodiment, the plurality of holes in the at least one inlet 132 may be six holes. Of course, in other embodiments, the plurality of holes may be any number of holes, including, without limitation, one, two, four, eight, ten, or even more holes. Each hole may be a circular hole having a diameter between 0.1 inches to 0.5 inches, such as 0.3 inches extending through the neck. Of course, holes of various shapes and sizes may be utilized as the at least one inlet.

The positioning of the at least one inlet along the neck may be operative to direct the flow of water and nutrients from the collector into the at least one inlet. As shown in FIG. 2, the at least one inlet 132 may be positioned near a midpoint of the neck 136 extending from the funnel 130. Of course, the at least one inlet may be positioned at any point along the neck to receive water from the funnel, including near the bottom or top of the neck.

As shown in FIG. 2, the funnel 130 may be permanently secured to the neck 136. For example, the funnel 130 may be secured to the neck 136 by glue. However, in other embodiments, the funnel may be removably secured to the neck.

In the embodiment shown in FIG. 2, the cap 134 may extend at least partially downwards to secure to the neck 136 through a friction fit to prevent debris, such as leaves, from entering the irrigation device 100. As shown, the cap 134 may comprise legs that extend downwards to secure with the neck 136. It is contemplated that the cap 134 may be operative to move along the neck 136 to control water flow into the at least one inlet 132. For example, the cap 134 may be positioned so that the at least one inlet 132 is fully opened, wherein the cap 134 does not obscure the at least one inlet 132. The cap 134 may also be positioned to at least partially obscure the at least one inlet 132 and may further obscure the at least one inlet 132 from external debris or to fully obscure the at least one inlet 132 to prevent water, nutrients, or debris from entering the reservoir.

A gasket 108 comprising a filter 110 may be positioned between the water collection means 102 and the adapter 106. More particularly, the gasket 108 may be positioned between a lower end of the neck 136 and the adapter 106 to filter the water and other nutrients prior to entering the reservoir. Of course, in other embodiments, the gasket may be located between the adapter and the first end of the body. It is contemplated that the filter may remove debris, such as soil, that may block the at least one outlet if permitted to enter the reservoir. In some embodiments, the gasket may be removable to permit the filter to be cleaned and/or replaced. A person of ordinary skill in the art will recognize many filtering materials that may be utilized, including, for example, and without limitation, netting, mesh, fine cloth, screens, or any other filtering material that may be desired.

The adapter may be any adapter that a person of ordinary skill in the art may desire. As shown in FIG. 3, the adapter 106 may comprise a male threaded end and the water collection means 102 may comprise a female threaded end, the male and female threaded ends configured to couple with one another. A person of ordinary skill in the art will recognize that male and female threading are common terms in the art wherein female threading extends along an inner portion of the structure and the male threading extends along an outer portion of the structures. The portion comprising the male threading may have a smaller diameter than the female threaded portion to permit the male threading to be inserted within the female threaded portion and to secure. Of course, a person of ordinary skill in the art will recognize many types of adapters, any of which may be utilized in the present invention. For example, the water collection means may comprise a male threaded end and the adapter may comprise internal, female, threading extending downwards into the body. The adapter may be a reducer adapter, couplings, bushings, unions, or other fittings, and the water collection means, first end of the body, and the adapter may be configured accordingly.

The body 104 may have a first end 152 and a second end 154 separated by a tubular sidewall 156 to define the reservoir. The first end 152 may be open to the adapter 106 in communication with the water collection means 102, and the second end 154 may comprise a stopper 160 to at least partially seal the second end 154 of the reservoir. A vent 162 may extend through the stopper 160 to prevent stagnant water collection in the reservoir by permitting water and other nutrients to drain out of a low point of the reservoir into the surrounding environment.

It is contemplated that the body 104 may be configured to permit the reservoir to temporarily store water and other nutrients to be delivered to the surrounding environment. The tubular sidewall 156 may have a diameter from about 1.5 inches to about 3 inches.

The body 104 may be defined by an upper portion, extending from the first end 152, and a lower portion extending from the second end 154. The sidewall 156 may be formed as a continuous body and a person of ordinary skill in the art will recognize that the upper and lower portions may refer segments along the sidewall 156. The distance between the first end 152 and the second end 154 may be from about twenty-four inches to about sixty inches, wherein the upper portion is from about fourteen inches to about thirty-five inches and the lower portion is from about ten inches to about twenty-five inches. In one embodiment, the distance between the first end 152 and the second end 154 may be about thirty-nine inches, wherein the upper portion is about twenty-one inches in length and the lower portion is about fourteen inches in length.

Returning to the embodiment in FIG. 2, the at least one outlet may extend through the sidewall 156 to permit water and nutrients stored in the reservoir to be distributed. The at least one outlet is shown as a first set of holes 158a, a second set of holes 158b, and a third set of holes 158c, each set of holes comprising two holes. The first set of holes 158a may be located about twelve to about fifteen inches about the second end 154, the second set of holes 158b may be located about eight to about eleven inches above the second end 154, and the third set of holes 158c may be located about three to about seven inches above the second end 154.

The first and third sets of holes 158a, 158c may be radially aligned with each other and the second set of holes 158b may be 90° offset from the first and third sets of holes 158a, 158b along the tubular sidewall 156. In some embodiments, each set of holes may be radially offset from another set of holes. In another embodiment, not shown, the at least one outlet may comprise a fourth set of holes located about two to about four inches above the second end, in radial line with the second set of holes. Of course, in other embodiments, any number or configuration of holes may be utilized.

Each hole may have a diameter sized to permit water and other nutrients to flow from the reservoir to the surrounding environment. For example, each hole may have a diameter from about 0.1 inches to about 0.4 inches. The diameter of each hole may be related to the diameter of the tubular sidewall to permit the gradual flow from the reservoir. Further, the diameter size may be related to a desired environment or plant that the irrigation device may be used with.

Returning to the embodiments shown in FIGS. 1-3, the vent 162 may be sized to permit gradual water flow out of the reservoir to prevent stagnant water. It is contemplated that the vent 162 may have a diameter smaller than the at least one outlet, to promote radial distribution of water and other nutrients. The vent 162 may have a diameter from about 0.2 inches to about 0.05 inches. In one embodiment, the vent 162 may have a diameter between 0.12 inches to about 0.08 inches. A person of ordinary skill in the art will recognize the smaller the diameter of the vent, the slower the water may escape from the vent.

The stopper 160 is illustrated as a lid extending over the second end 154. However, in other embodiments not shown, the stopper may be configured as a nylon veil extending over the second end of the body. Of course, other stoppers may be utilized and any stopper that may at least partially seal the lower end of the reservoir may be utilized.

Returning to the embodiment illustrated in FIG. 2, water and other nutrients may be collected by the funnel 130 from the atmosphere and directed to the at least one inlet 132 disposed of on the neck 136 in horizontal communication with the reservoir through the adapter 106. The water and other nutrients may pass through filter 110 before entering the reservoir to remove debris. The water may be stored in the reservoir until the water level in the reservoir is above any of the at least one outlet, when it may flow out of the reservoir. It is contemplated that the rate of water flow may be constant across all outlets below the water level.

It is contemplated that water and nutrients may be permitted to slowly drain out of the vent 162 when the water level is below the at least one outlet to reduce stagnant water in the system.

A person of ordinary skill in the art will recognize that soil reaches a maximum hydration and when the soil reaches maximum hydration, water may not exit the at least one outlet until the hydration level is reduced, thus controlling water flow out of the system. Water may be absorbed by the plant's root system, or other organisms, reducing the soil's hydration level which may permit more water and nutrients to be released into the soil as needed.

Figure 4:
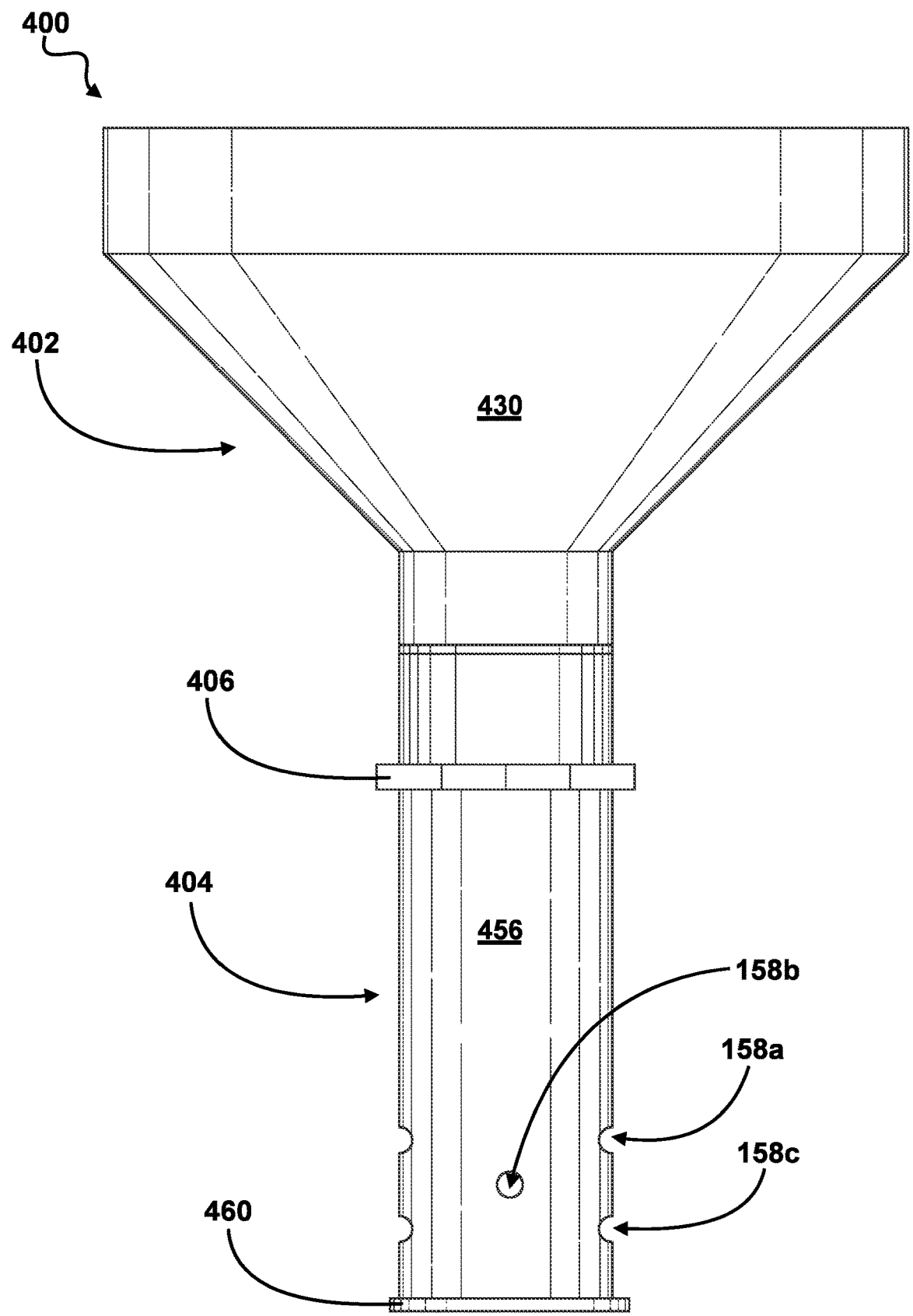
FIG. 4 shows a front view in accordance with another embodiment of the irrigation device.
Figure 5:
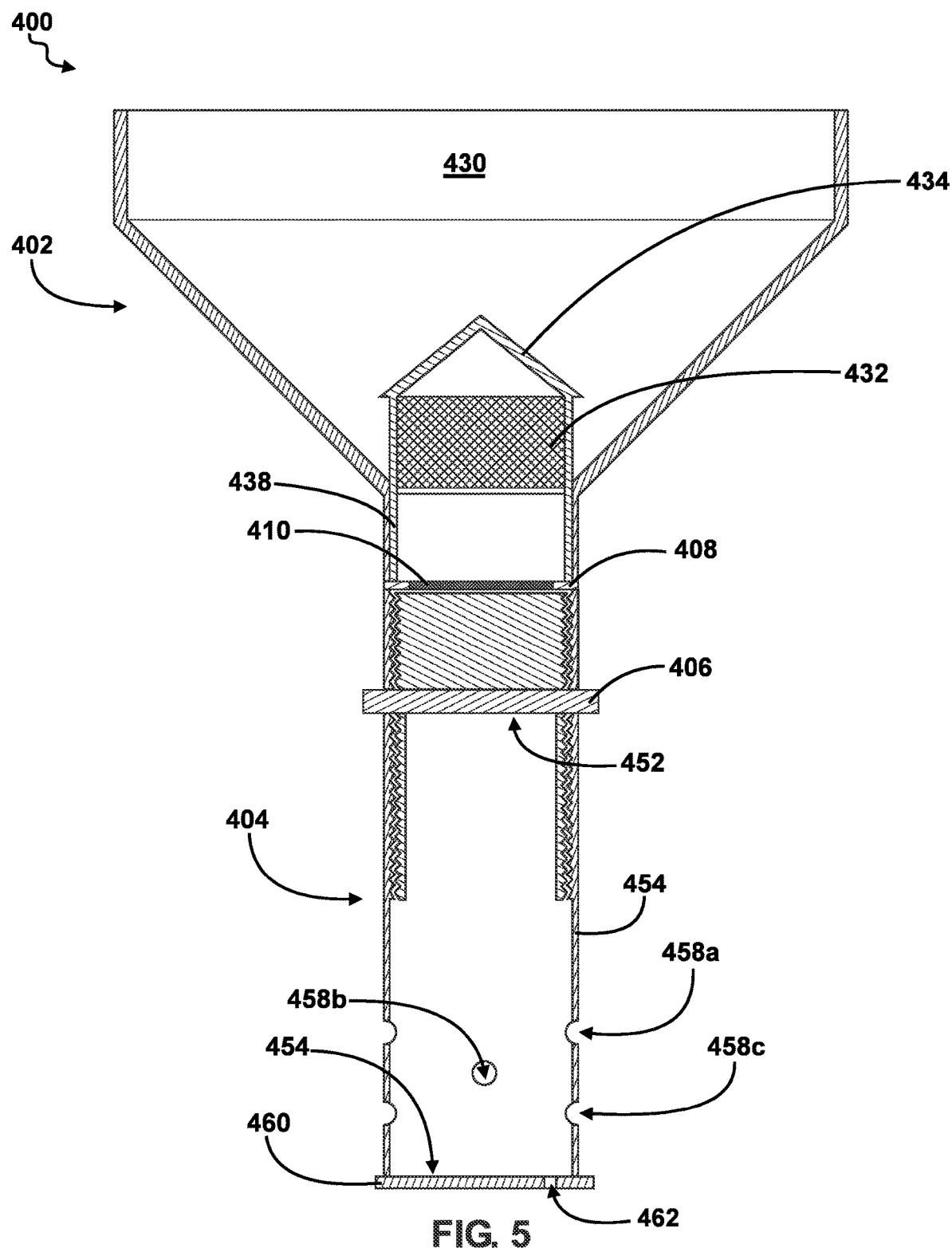
FIG. 5 shows a cross-section view of the embodiment of the irrigation device in FIG. 3.
Figure 6:
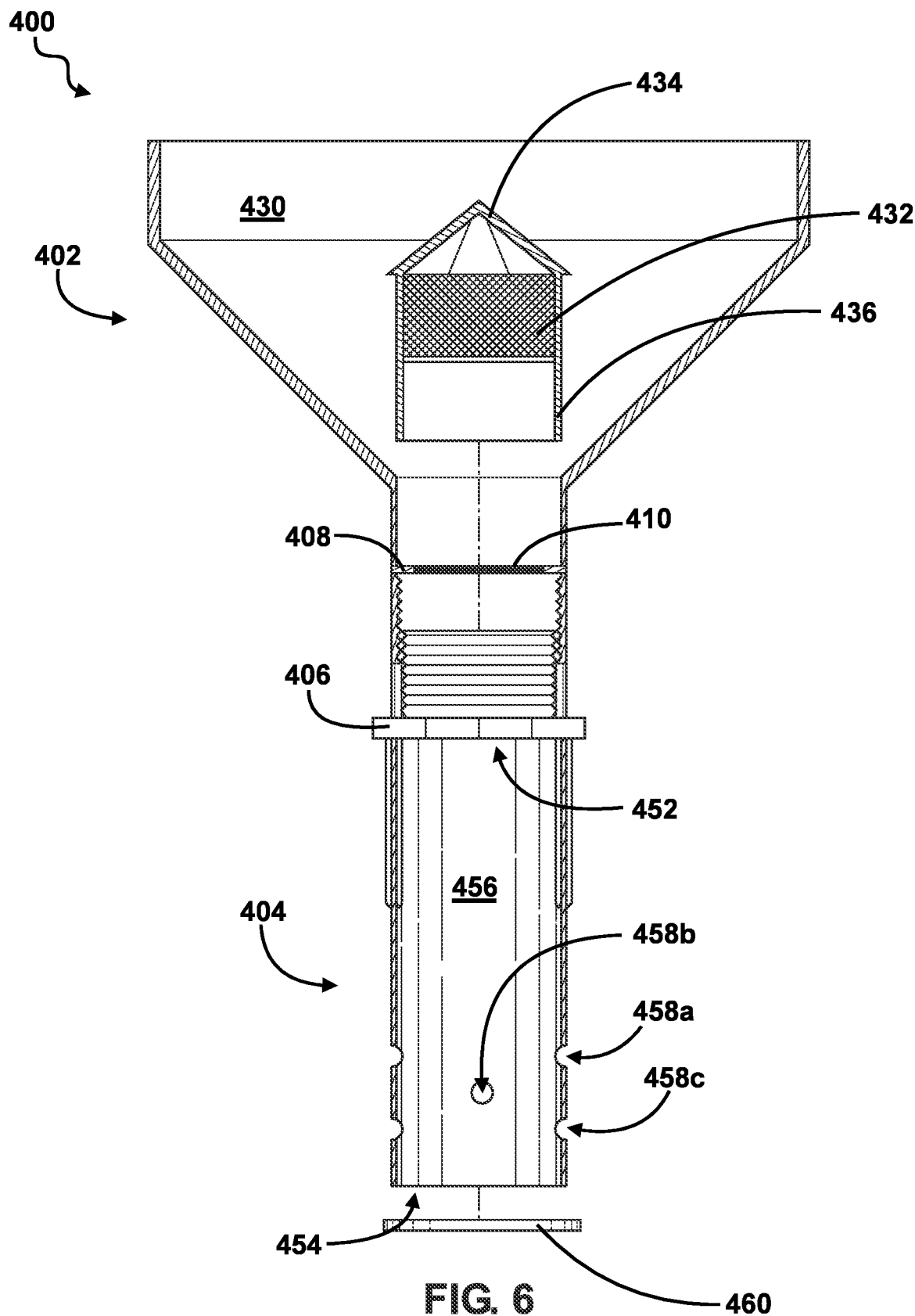
FIG. 6 shows an exploded view of the embodiment of the irrigation device in FIG. 3.

Another embodiment of an irrigation device 400 is illustrated in FIGS. 4-6. FIG. 4 shows a front-side view of the irrigation device 400 comprising a water collection means 402 in horizontal communication with a bod 104 defining a reservoir comprising at least one outlet through an adapter 406. FIG. 5 is a cross-sectional view of the embodiment illustrated in FIG. 4 and FIG. 6 is an exploded view of the same.

As shown in FIG. 5, the water collection means 402 comprises a collector configured as a funnel 430 and a cap 434 permanently secured to a neck 436 comprising an inlet 434. The neck 436 may permit the cap 434 to secure with the funnel 430 so that the inlet 434 may be positioned within the funnel 430 to receive water and other nutrients. The inlet 434 may comprise an inlet filter extending over the inlet 434 to stop debris from entering the reservoir. The inlet filter may be any filter that a person of ordinary skill in the art may desire, including, without limitation, a net, membrane, mesh, fine cloth, or screen. It is contemplated that debris connected by the inlet filter may be caught in the funnel 430 and may be removed without necessitating the removal of the water collection means 402 from the adapter 406. A gasket 408 positioned between the adapter 406 and the water collection means 402 may comprise a filter 410. The inlet filter and the filter 410 may be operative to filter debris of different sizes and may permit the water and other nutrients to be double-filtered before entering the reservoir.

The inlet 434 may extend on the neck 436 from the cap 434 to where the neck 436 extends from the funnel 430. In some embodiments, the neck 436 may be permanently secured to the funnel 430. For example, the neck 436 may be welded, glued, extraction molded, or any other securement that may be recognized to secure it to the funnel 430. It is contemplated that the neck 436 is permanently secured to the funnel 430 may result in the inlet 434 remaining in an open state, permitting water and other nutrients to flow into the reservoir. However, in other embodiments, the neck may removably secure to the funnel to permit partially open and closed states. The neck may be inserted into the lower end of the funnel to obscure the inlet, preventing the flow of water and nutrients into the reservoir.

The body 402 may be separated into two portions, an upper portion extending off the first end 452 and a lower portion extending off the second end 454 comprising the at least one outlet. The lower portion may, during use, be the portion of the body 402 that extends below the soil surface to provide water and nutrients to a plant's root system during use. The upper portion may extend above the soil surface and may be in communication with the adapter 406.

In the embodiment shown in FIG. 5, the upper portion of the body may comprise a female threading and the adapter 406 may comprise male threading on an end adjacent to the first end 452 of the body 402. The female threading may be disposed of along an inner of the sidewall 456 to permit the male threading of the adapter 406 to extend into the body 402 for securement.

A lower end of the water collection means 402 may comprise a female threading to secure with a male threading extending upwards from the adapter 406. Of course, in other embodiments, any configuration of male and female threading may be utilized. Further, any means of securing the water collection means and the body to the adapter may be utilized, including friction fit, interlocking elements, or any other means that a person of ordinary skill in the art may desire. A person of ordinary skill will recognize that the threading may be sized according to the diameter of the sidewall.

Figure 7:
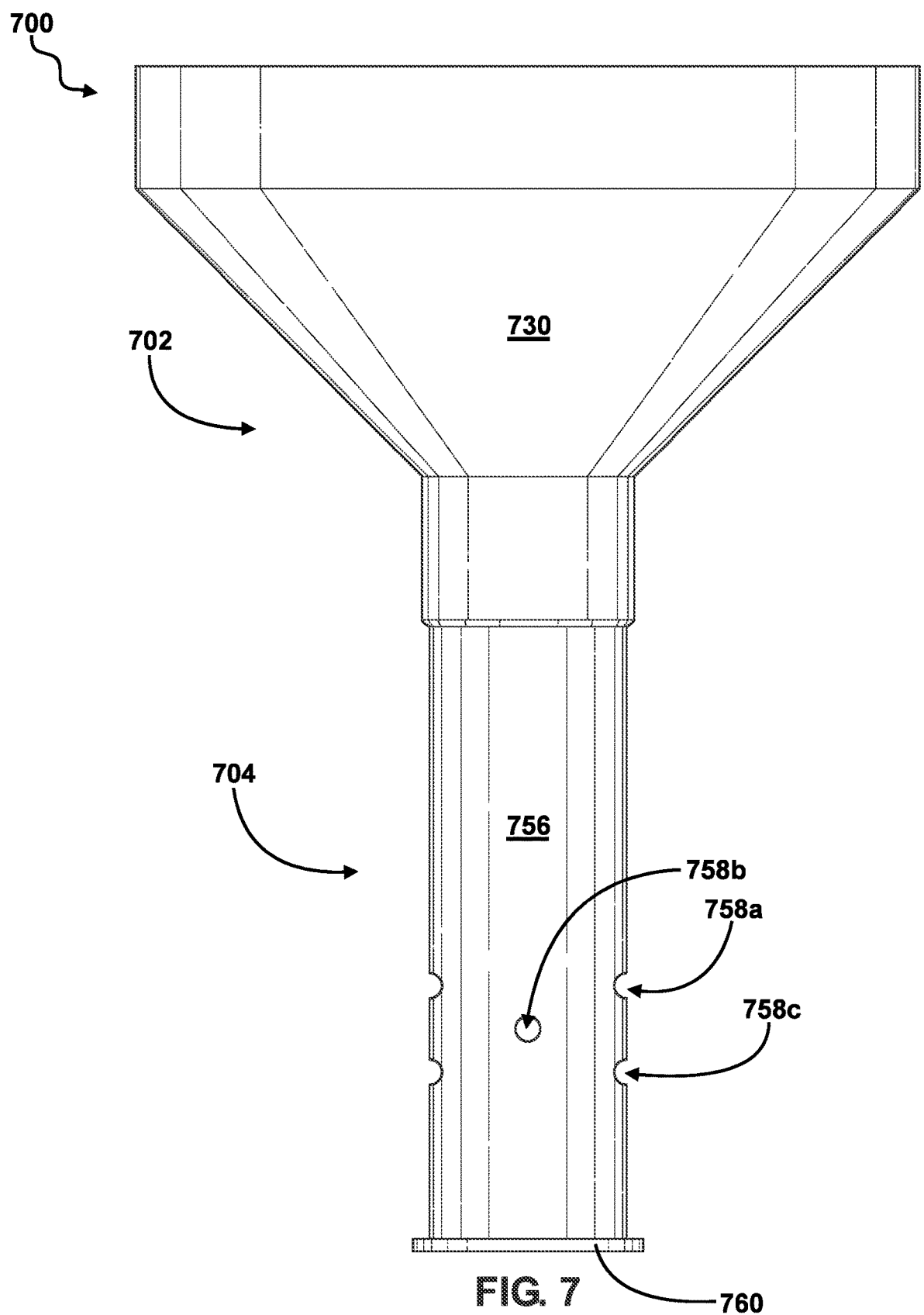
FIG. 7 shows a front view in accordance with a third embodiment of the irrigation device.
Figure 8:
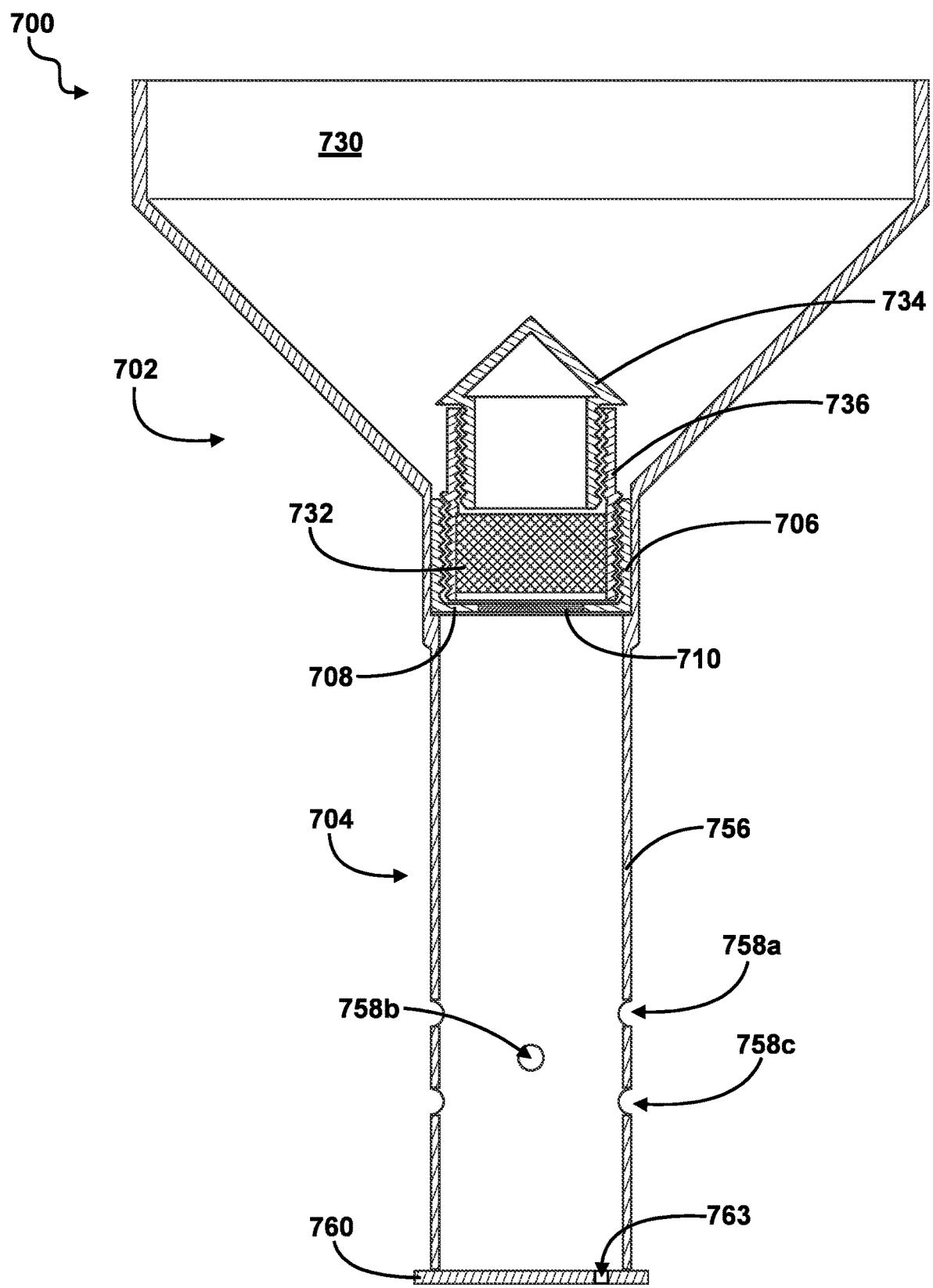
FIG. 8 shows a cross-section view of the embodiment of the irrigation device in FIG. 7.
Figure 9:
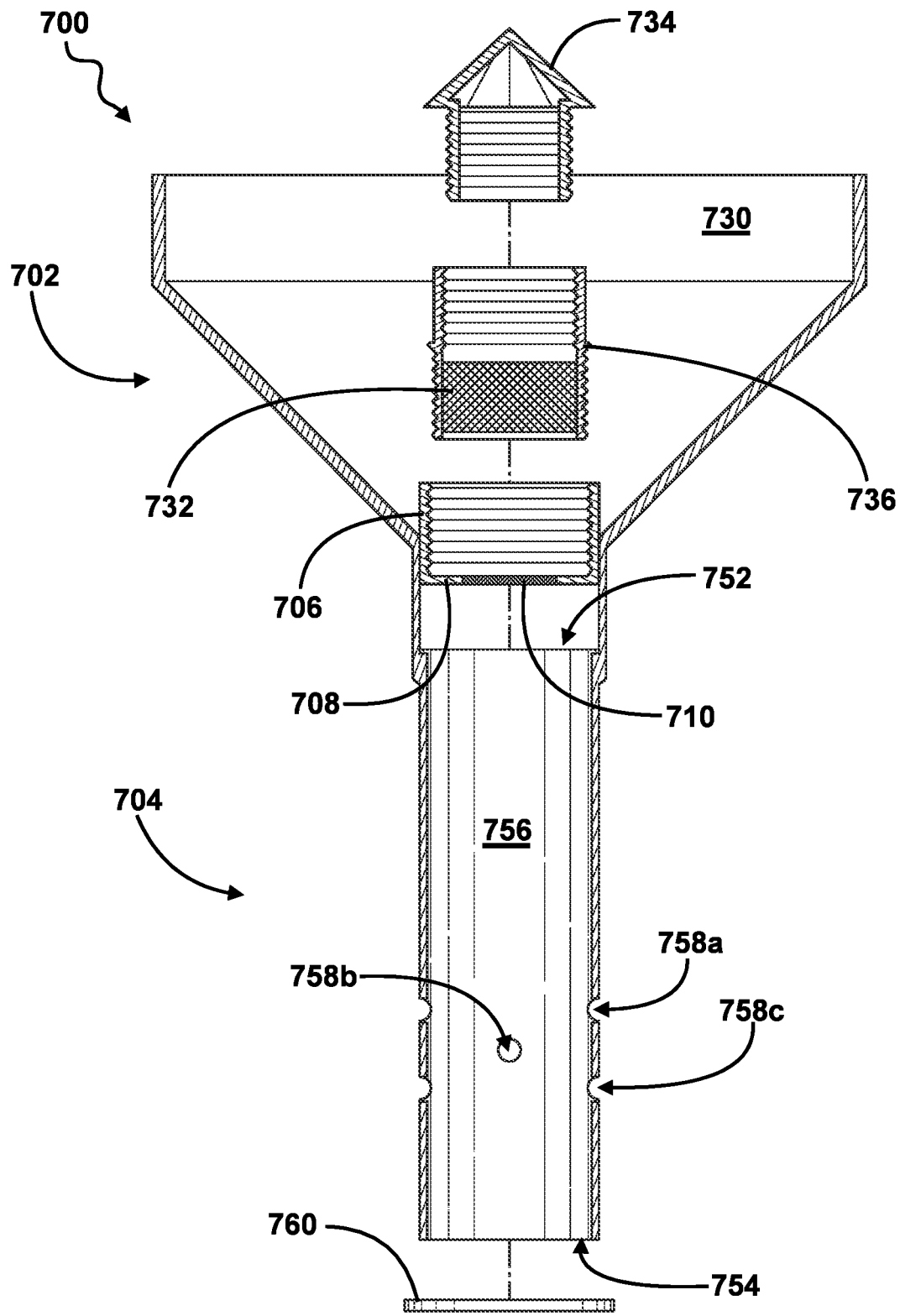
FIG. 9 shows an exploded view of the embodiment of the irrigation device in FIG. 7.

Another embodiment of an irrigation device 700 is shown in FIG. 7. A cross-sectional view of the irrigation device 700 is shown in FIG. 8 and FIG. 9 illustrates an exploded view of the same. The irrigation device 700 comprises a water collection means 702 coupled to a body 704 to permit water and nutrients collected at the water collection means 702 to enter a reservoir defined by the body 704. The body 704 may comprise a first end 752 and a second end 754 separated by a tubular sidewall 756 comprising at least one outlet configured as a first set of holes 758a, a second set of holes 758b, and a third set of holes 758c.

As shown in FIG. 8, the irrigation device 700 may comprise a water collection means 702 comprising a funnel 730 and a cap 734 removably secured to a neck 736 comprising an inlet 732. The inlet 732 may be disposed of along a lower end of the neck 736 which may comprise a threading configured to engage with an adapter 706. The adapter 706 may secure with the funnel 730 through a friction fit, and a gasket 708 comprising a filter 710 may be positioned between the adapter 706 and a body 704. The body 704 may comprise a first end 752 and a second end 754 separated from each other by a tubular sidewall 756 and at least one outlet extending through the sidewall 756.

The funnel 730 may be secured to the sidewall 756 such that the irrigation device 700, as visible in FIG. 7 may be a continuous structure and the adapter 706 may be disposed of within the lower end of the funnel 730, as seen in FIG. 8. Further, in some embodiments, the adapter may be integrated into the water collection means or the body. As such, the adapter may be understood to be any means capable of securing any of the water collection means and the body to one another.

As shown in FIG. 8, the cap 734 may comprise male threading and the neck 736 may comprise female threading operative to secure with the male threading. Further, the neck 736 may comprise male threading along any of its outer and the adapter 706 may comprise a female threading configured to couple to the neck 736.

The threading between the cap 734, the neck 736, and the adapter 706 may permit each to be removably secured with one another. It is contemplated that this may provide access to a filter 710 extending across a gasket 708 disposed of between the adapter 706 and the first end 752 of the body 704. As such, the diameter of the adapter 706 may be larger than the diameter of the neck 736 which may have a larger diameter than the diameter of the cap 734 to permit each to nest and couple with the respective element. In other embodiments, not shown, any of the adapter, neck, or cap may secure to another using another securement means, such as friction fit, latching, or any other fit that a person of ordinary skill may desire.

In some embodiments, not shown, the neck may be integrated with the cap and may directly secure with the adapter. Of course, in other embodiments, the neck may be integrated with the adapter or may be removed from the device.

Returning to FIG. 8, the cap 734, neck 736, and the adapter 706 may be fully seated with each other to define a closed state to prevent water and other nutrients from entering the reservoir. The threading may permit the cap 734, the neck 736, and/or the adapter 706 to be less than fully seated within another to define an at least partially open state of the reservoir. Indeed, the cap 734 and/or the neck 736 may be fully removed from the system to permit water and other nutrients to pass directly through the adapter 706 and gasket 708 into the reservoir.

The inlet 732 may be located near a lower end of the neck 736, to permit the inlet 732 to be closed when the neck 736 is fully secured to the adapter 706. Of course, the inlet may be positioned along any portion of the water collection means in communication with the reservoir. Returning to FIG. 8, the inlet 732 may comprise an inlet filter extending over any of the neck 736 to prevent debris from entering the reservoir through the inlet 732. The inlet filter may be a filtering net, plurality of holes, mesh, fine cloth, screen, or any other means capable of filtering.

Figure 10:
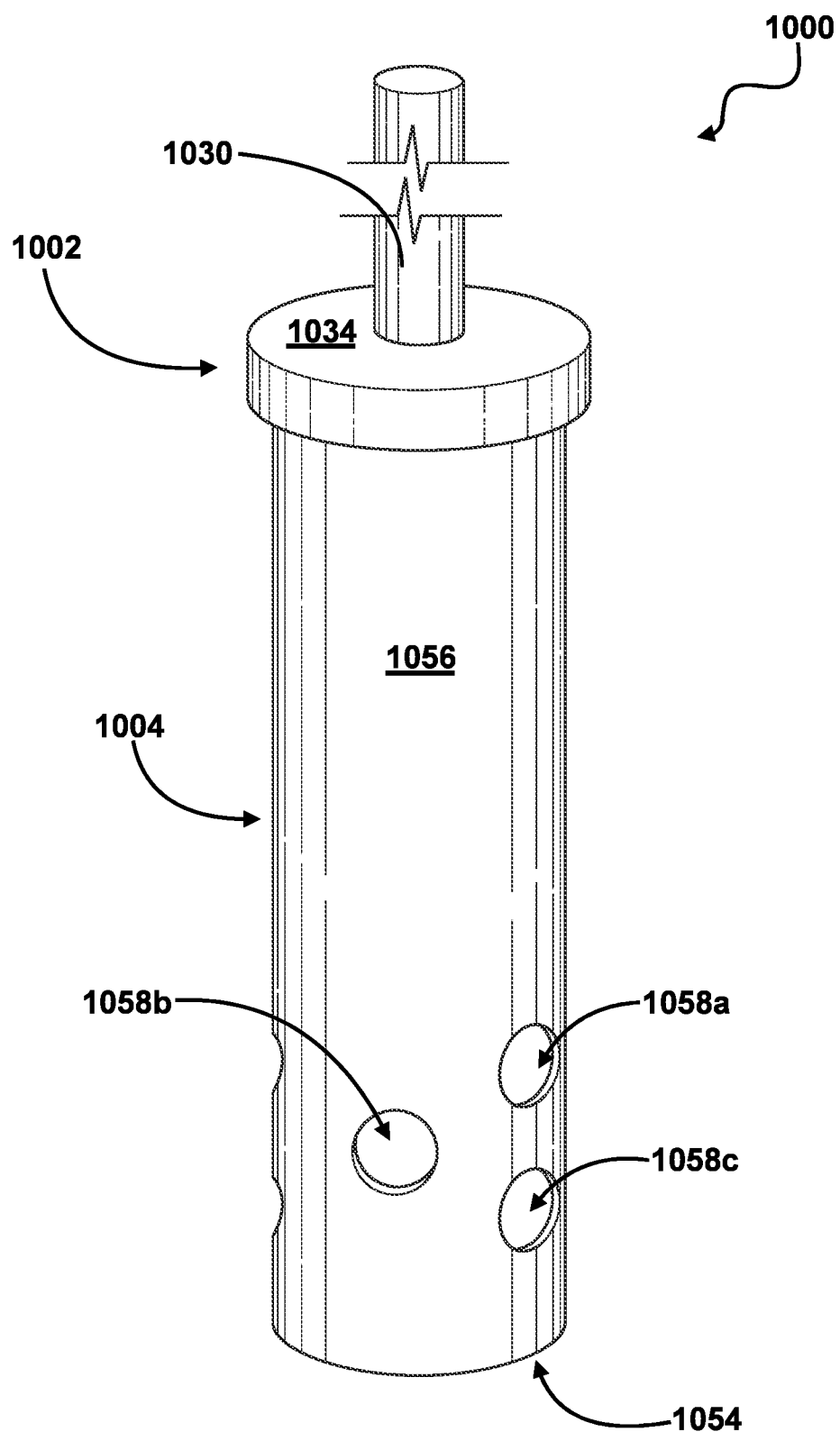
FIG. 10 shows a perspective view of one embodiment of the irrigation device.

FIG. 10 shows another embodiment of an irrigation device 1000 comprising a water collection means 1002, an adapter, a gasket comprising a filter (obscured), and a body 1004 defining a reservoir. The body 1004 may have a first end (obscured) and a second end 1054 separated from each other by a tubular sidewall 1056. At least one outlet, configured as a first set of holes 1058a, a second set of holes 1058b, and a third set of holes 1058c may extend through the sidewall. The second end 1054 may comprise a stopper and a vent extending through the stopper to prevent stagnant in the reservoir.

The water collection means 1002 may be configured as a cap 1034 comprising an inlet 1032 coupled to a collector configured as a pipe 1030. The pipe 1030 may be operative to collect water and other nutrients from a source (not shown) and distribute the water and nutrients to the irrigation device 1000.

In this embodiment, the adapter and the gasket may be positioned internal to the cap 1034. The adapter may comprise a threading and the first end 1052 of the body 1004 may comprise a complimentary threading. For example, the adapter may comprise female threading and the first end 1052 may comprise external, male, threading on the tubular sidewall 1056.

In some embodiments, the cap 1034 and the adapter may be integrated, however, in other embodiments, the adapter and the cap 1034 may be independent and operative to secure with one another.

It is contemplated that the adapter may permit a plurality of embodiments of water collection means, such as the embodiments described in FIGS. 1-10, to be interchangeably utilized with any embodiment of the body.

Further, a kit 1100 in use as an irrigation system is shown in FIG. 11 a plurality of the irrigation devices 1000 shown in FIG. 10 may be in communication with each other. More particularly, the pipe 1030 may connect the plurality of irrigation devices 1000 to one another to permit the collection and delivery of water and other nutrients from a water source to the plurality of irrigation devices. It is contemplated that this may be utilized in environments where atmospheric water may not provide sufficient water.

Each irrigation device 1000 may be placed between 5 inches to about 24 inches away from a plant 1100. A person of ordinary skill in the art will recognize that the exact distance between the irrigation device 1000 and the plant 1101 may vary according to the needs and size of the plant. For example, the irrigation device 1000 may be placed from about ten to about twelve inches from a plant between about nine to twelve inches in size.

In some embodiments, the kits may comprise a plurality of embodiments of water collection means.

CONCLUSIONS, RAMIFICATIONS, AND SCOPE

While certain embodiments of the invention have been illustrated and described, various modifications are contemplated and can be made without departing from the spirit and scope of the invention. For example, the irrigation device may be utilized with a variety of nutrients to deliver nutrients to the soil. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the irrigation device and kit with which that terminology is associated. In general, the terms used in the following claims should not be constructed to limit the irrigation device and kit to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the irrigation device and kit is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the method, system, and apparatus are contemplated in any number of claim forms. Thus, the inventor reserves the right to add additional claims after filing the application to pursue such additional claim forms for other aspects of the irrigation device and kit.

What is claimed is:

1. An irrigation device comprising:
   a water collection means comprising a cap, at least one inlet, and a collector in communication with the at least one inlet, wherein the cap is operative to at least partially block the at least one inlet from external debris;
   a body having an upper portion and a lower portion, the body comprising a first end in communication with the at least one inlet, a second end comprising a stopper, the first and second end separated by a tubular sidewall defining a reservoir;
   at least one outlet disposed on the lower portion of the sidewall operative to permit water to pass through the at least one outlet;
   an adapter operative to secure the body to the water collection means; and
   a gasket positioned adjacent to the adapter comprising a filter,
   wherein any of the body is configured to extend below a soil surface, and the water collection means may extend above the soil surface.

2. The irrigation device of claim 1, wherein the water collection means further comprises a neck defined by the at least one inlet, and wherein the collector is configured as a funnel secured around the neck to direct water from the funnel into the at least one inlet.

3. The irrigation device of claim 1, wherein the collector is configured as tubing configured to direct water from a water source to the at least one inlet, and wherein the at least one inlet is defined by the cap.

4. The irrigation device of claim 1, wherein the at least one outlet is configured as a plurality of holes extending through the sidewall, each hole having a diameter from about 0.2 inches to about 0.3 inches.

5. The irrigation device of claim 1,
   wherein the tubular sidewall has a diameter from about 1.5 inches to about 3 inches,
   wherein the lower portion is about eighteen inches in length, and the upper portion is about 21 inches in length, and
   wherein the at least one outlet comprises:
      a first set of holes located about 12 to about 15 inches above the second end,
      a second set of holes located about 8 to about 11 inches above the second end, and
      a third set of holes located about 3 to about 7 inches above the second end,
   wherein the first and third sets of holes are disposed in line with each other in the sidewall, and the second set of holes is disposed in the sidewall at a 90-degree offset relative to the first and third set of holes.

6. The irrigation device of claim 5, wherein the at least one outlet further comprises a fourth set of holes located about 2 to about 4 inches above the second end, the fourth set of holes located in line with the second set of holes.

7. The irrigation device of claim 1, wherein the stopper comprises a vent configured to avoid water residuals in the reservoir.

8. The irrigation device of claim 1, wherein the irrigation device may extend from about 16 to 18 inches below the soil surface.

9. A kit for irrigation comprising at least one irrigation device, each irrigation device comprising:
   a water collection means comprising a cap, at least one inlet, and a collector in communication with the at least one inlet;
   a body having an upper portion and a lower portion, the body comprising a first end in communication with the at least one inlet, a second end comprising a stopper, the first and second end separated by a tubular sidewall defining a reservoir;
   at least one outlet disposed on the lower portion of the sidewall operative to permit water to pass through the at least one outlet;

an adapter operative to secure the body to the water collection means; and a gasket positioned adjacent to the adapter comprising a filter, wherein any of the body is configured to extend below a soil surface such that the at least one outlet may be operative to bypass the soil surface and deliver water and nutrients to a plant's root system and the collection means may extend above the soil surface, and the cap may at least partially protect the inlet from external debris.

10. The kit of claim 9, wherein any of the at least one irrigation device is connected to another at least one irrigation device at the at least one inlet.

11. The kit of claim 9, wherein any of a plurality of collection means may be interchangeable to accommodate any of atmospheric water collection, direct irrigation, or a combination of these methods.

12. The kit of claim 9, wherein the water collection means further comprises a neck defined by the at least one inlet, and wherein the collector is configured as a funnel secured around the neck operative to direct water from the funnel into the at least one inlet.

13. The kit of claim 9, wherein the collector is configured as tubing configured to direct water from a water source to the at least one inlet and wherein the at least one inlet is defined by the cap.

14. The kit of claim 9, wherein the at least one outlet is configured as a plurality of holes disposed on the sidewall, each hole having a diameter from about 0.2 inches to about 0.3 inches.

15. The kit of claim 9,
wherein the tubular sidewall has a diameter from about 1.5 inches to about 3 inches,
wherein the lower portion is about eighteen inches in length, and the upper portion is about 21 inches in length, and
wherein the at least one outlet comprises:
a first set of holes located about 12 to about 15 inches above the second end,
a second set of holes located about 8 to about 11 inches above the second end, and
a third set of holes located about 3 to about 7 inches above the second end,
wherein the first and third sets of holes are disposed in line with each other in the sidewall, and the second set of holes is disposed in the sidewall at a 90-degree offset relative to the first and third set of holes.

16. The kit of claim 15, wherein the at least one outlet further comprises a fourth set of holes located about 2 to about 4 inches above the second end, the fourth set of holes located in line with the second set of holes.

17. The kit of claim 9, wherein the stopper comprises a vent configured to avoid water residuals in the reservoir.

18. The kit of claim 9, wherein the irrigation device may extend from about 16 to 18 inches below the soil surface.

* * * * *